Sept. 7, 1954  D. O. ADAMS  2,688,209
PLANT CONTAINER
Filed Jan. 24, 1952
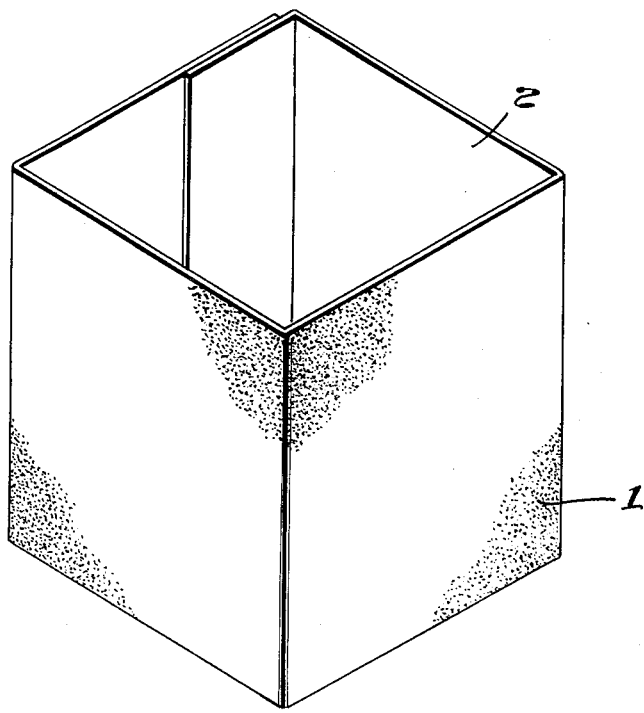
INVENTOR.
DANIEL O. ADAMS
BY
ATTORNEY Patented Sept. 7, 1954

2,688,209

UNITED STATES PATENT OFFICE 2,688,209

PLANT CONTAINER

Daniel O. Adams, East Walpole, Mass., assignor to Bird & Son, inc., East Walpole, Mass., a corporation of Massachusetts Application January 24, 1952, Serial No. 268,041

9 Claims. (Cl. 47—37)

This invention relates to plant containers and an improved method of growing young plants which are subsequently to be transplanted.

It is well known that when a number of plants are grown in close proximity to one another in a common container, their roots become entangled and enmeshed. When these plants are separated for transplanting, extensive root damage occurs. As a result the plant suffers transplanting shock, which is characterized by a marked retardation or actual cessation of growth.

To avoid transplanting shock, it has become customary to grow young plants in individual containers, which retain the roots and prevent their becoming entangled with the roots of adjacent plants. Plant containers now in use are essentially impervious to plant roots and therefore must be removed at the time of transplanting to prevent stunting and other damage to the plants. The removing of the container during transplanting leaves the root ball unprotected at the very moment it is being subjected to the most handling with the result that transplanting shock occurs thus nullifying the virtues of growing the plant in an individual container.

Attempts have been made to develop plant containers which need not be removed from the plant at the time of transplanting. These attempts have not been successful. Either the containers fail to retain the plant roots during the pre-transplanting period or are insufficiently permeable to the roots after transplanting. In the first case the virtues of growing the plants in individual containers is lost. In the second case retardation of root development and stunting occur.

Attempts have been made to construct plant containers which will initially retain plant roots, but after contact with soil for a certain period of time will become permeable to the roots. Unfortunately the processes by which these containers become permeable to plant roots are gradual in nature. Plant containers of this type either allow the passage of some roots before transplanting or are insufficiently permeable to roots after transplanting. Also, this type of container must be designed for a single definite pre-transplanting period, requiring different containers for different pre-transplanting intervals. This is undesirable because it is frequently necessary or desirable to alter the length of the pre-transplanting interval after a portion thereof has elapsed in view of the condition of the crop or availability of time or labor. Another disadvantage lies in the fact that the rate at which the permeability of the container to plant roots increases depends on a number of variable factors, such as the soil, the growing conditions, and the crop grown in the container. Thus a container suitable for a certain crop under certain conditions may be entirely unsuitable for a different crop or the same crop under different conditions.

An object of this invention is to provide a plant container such as a band or pot which will serve as a barrier to plant roots for prolonged intervals of time, yet may be rendered immediately permeable, when so desired, to the roots of growing plants during the initial periods of their development. Before it is rendered permeable to the roots, the container confines the roots to a definite locality and prevents their entanglement with the roots of adjacent plants. The plant can thus develop without competition with its neighbors and may be transplanted without root damage to itself or adjacent plants thereby avoiding or minimizing transplanting shock. My container is so constructed that during transplanting it may be easily rendered permeable to the roots and hence the container need not be removed from the root ball during transplanting.

A further object of this invention is to provide a relatively cheap and efficient plant container and method of growing plants.

A further object of this invention is to provide a plant container having a wall which is normally impenetrable to plant roots but which after having been in contact with a plant-growing medium may be easily fractured to render it permeable to plant roots.

My invention prevents possible damage to plants by incorrect actions of purchasers of small plants. Plants sold in ordinary conventional containers are often through ignorance or mistake transplanted without removing the container with the result that the plants are unable to obtain sufficient moisture and nourishment with consequent stunting or death of the plant. My container may be rendered permeable to the roots at the time of sale of the plant contained therein so that normal plant development can take place without the need of removing the containers.

Other objects and features will appear in the following description taken in conjunction with the accompanying drawing which is a perspective view of a preferred container of this invention.

My container consists of or possesses as a portion thereof a layer or surface of a root barrier material 1 which after contact with the plant-growing medium, such as moist soil, is easily fracturable and thus made permeable to roots without destroying its capacity to confine the plant-growing medium, but, before it is fractured, effectively retains the roots notwithstanding prolonged contact with such media. When the container is handled, as in transplanting, the easily fracturable root barrier may be fractured, and thus rendered permeable to the plant roots.

I prefer to so construct the container that the root barrier material is present merely as a coating, lining or layer associated with a supporting structure 2 of a material which decomposes, disintegrates, or otherwise becomes readily permeable to plant roots when it is maintained in contact with the soil, or other plant-growing media. Said supporting structure is provided with a layer or coating of, or may be partially impregnated with, the root barrier material 1. Such a container will retain the roots over a prolonged period of time provided that the root barrier is unbroken. During the handling of the container, as would occur in transplanting, the root barrier may be fractured, immediately rendering the container permeable to the roots.

The root barrier material 1 may be any material which is essentially impermeable to plant roots when it is in an unfractured state, which retains this property despite prolonged contact with plant-growing media, and which is easily fracturable after it has been in contact with a plant-growing medium to render it permeable to plant roots. It has the property of breaking upon bending after contact with plant-growing media. It may be, for example, any one or more of suitable members of the group of natural and synthetic resins, drying and semi-drying oils including tall oil (e. g. linseed oil or soybean oil), natural and synthetic rubber which has been treated to render it brittle after contact with plant-growing media (e. g., heating in the presence of driers) bituminous materials and waxes. It is generally advantageous to blend two or more members of the above group to obtain the desired properties. Compounding ingredients such as pigments, fillers, plasticizers, vulcanizing agents, extenders, and the like may be included.

The supporting structure 2 is a carrier for the root barrier material and serves to strengthen it and prevent premature rupture of this root barrier material prior to contact with plant-growing media. The supporting structure is perishable, i. e., decomposes, disintegrates, loses cohesiveness or otherwise becomes root permeable after contact with plant-growing media. Examples of suitable materials are paper, paperboard, felt, woven and unwoven textile materials. These may be composed of cellulosic or ligno-cellulosic, animal (e. g., hair, wool) or mineral (e. g., asbestos, rock wool) fibers, with or without suitable bonding agents. It may be composed of materials which are attacked by the micro organisms of the soil and thus decomposed, or it may be held together by adhesives (e. g., starch or casein) which are similarly decomposed. It may be composed of materials (e. g., paper) which when in contact with the soil disintegrate or lose cohesiveness due to the action of the moisture in the soil. The only requirement is that after contact with a plant-growing medium the supporting structure permits plant roots to penetrate it without difficulty. The supporting structure may be in sheet form or be molded or otherwise formed into the desired shape. The support need not necessarily be kept dry during the pretransplanting stage.

When the root barrier comprises a part only of the container, such as a coating, layer, or the like, the latter may be applied to the supporting structure by any of the methods known in the art, e. g. by use of a roll coater, knife coater, brush coater, air brush or the like. The barrier material may be on the inside, outside, or intermediate plies of the container, although I prefer that the barrier layer be located on the outside of the supporting structure, because in this location it tends to prevent sticking together of the containers and facilitates handling. The barrier layer in this position is also more easily ruptured when so desired. The barrier may consist of a plurality of coatings or layers, and may be applied to the supporting structure either before or after the latter is formed into shape. The barrier layers may consist of a surface coating with a minimum of penetration or it may impregnate the supporting structure to a measurable degree. The barrier material may also serve as a laminating adhesive joining plies of base material making up the supporting structure.

The container may have a bottom, i. e., it may be a pot, or it may have no bottom, i. e., it may be a band. The container may be cylindrical, conical, prismatic, or of any other shape.

In this disclosure "plant-growing media" is intended to include all substances in which plants may be grown, e. g., soil, vermiculite, peat moss, sand or water.

If desired, fertilizers, plant foods, hormones, and other plant reactive or plant protective materials, e. g., fungicides, and the like, may be incorporated into the container structure. Preferably the container does include a nitrogen nutrient.

As specific examples illustrative of my invention, the following are given:

*Example I*

Chipboard, having a basis weight of 86 pounds per 1000 square feet and a caliper of 0.024 inch, was coated on one side with a molten mixture containing 80% Transphalt (a brittle bituminous material and presumably a product derived by refining of gas-still residues) and 20% of an asphalt having a melting point of approximately 160° F. This coating was applied using a hot knife coater which was shimmed to give a coating 0.005 inch thick when hot. This coated board was cut into pieces 7.5" x 2.5". Each piece was then treated with a solution containing 40 grams per liter of urea, a nitrogen nutrient. After this solution had dried the pieces were scored on the uncoated side along 4 lines parallel to the shortest dimension of the pieces. These scores were located at points 1 9/16", 3 1/4", 4 15/16" and 6 5/8" from one end of the piece. The pieces were bent at right angle at the scores and the ends sealed with an asphalt adhesive. This resulted in plant bands 2 1/2" high and 1 11/16" square with the coating on the inside. These bands were used for growing snapdragons for 10 weeks in a greenhouse flat. At the end of this time the plants were transplanted into a greenhouse bench without removal of the bands. At the time of transplanting the bands were carefully examined and no penetration of the bands by plant roots was observed. During transplanting each band was flexed slightly by pressing lightly on opposite corners. This pressure shattered the brittle coating material and made the band permeable to plant roots. After benching, the plants developed in a normal fashion and supplied blooms satisfactory for cutting purposes. Control plants, which were grown in commercial asphalt-saturated fiber plant bands, and from which the bands were removed during transplanting, showed inferior plant development when compared with the plants grown in bands made according to this example.

*Example II*

Plant bands were made in the same manner as in Example I except that the coating material was a hard tough copolymer of styrene, styrene homologues and substituted styrenes having a ring and ball melting point of 75° C., forming a water-thin solution at 120° C. and available commercially as Piccolastic D-75. The coating was originally a clear amber color and moderately flexible. After ten weeks of contact with moist soil the coating had become an opaque yellow color and extremely brittle. Snapdragons grown in these bands as described in Example I were identical in quality to those grown in the bands of Example I.

*Example III*

Plant bands 3" x 3" x 3" were prepared from chipboard having a basis weight of 52 pounds per 1000 square feet in much the same manner as described in Example I. The chipboard for these bands was treated so that it contained 4.5% to 5.0% urea on a weight basis. The chipboard was coated on one side with a root barrier material comprising a mixture of 77% gilsonite and 23% crude tall oil. The bands were made up with the coating on the outside. These bands were used to grow tomato plants from the seedling stage until ready to be transplanted into the field. During the transplanting operation the bands were squeezed slightly by hand, causing shattering of the root barrier. The plants were transplanted into the field without removing the band and continued their development after transplanting.

*Example IV*

A sheet of felt, composed of 35% wood fiber, 25% sulphite screenings, 25% mixed papers, and 10% wood shoddy, was coated with a 3 mil layer of a mixture of 70% gilsonite and 30% asphalt. The sheet was cut into blanks and the blanks formed into plant bands.

*Example V*

Pulp, prepared by beating old newspapers in a hollander beater, was molded into the shape of a flower pot, pressed in this shape to remove further water, and then dried. The outside of this molded pot was given a spray coating of a mixture of 90% gilsonite and 10% butyl stearate, dissolved in sufficient varnolene to reduce it to a sprayable consistency.

*Example VI*

A hot melt coating of Transphalt was applied to scrim using a knife coater. While still warm the coated scrim was cut into blanks and formed into flower pots.

*Example VII*

A plant container was made from a coated chipboard prepared as follows: A coating, consisting of GR-S type 6 latex plus 0.1 to 0.2% cobalt drier based on the dry rubber solids, was applied to the chipboard and the combination was baked 16 hours at 150° F. The GR-S type 6 latex consists of a copolymer of equal parts of styrene and butadiene and is supplied at approximately 60% solids. The cobalt drier may be cobalt naphthenate and is added to the latex in the form of an emulsion. The resultant product was cut into blanks and formed into plant bands or plant pots.

*Example VIII*

Another satisfactory coating contains 30 to 40% of gilsonite, 30 to 35% of 140° melting point (ring and ball method), cracking coil tar (a residuum obtained during the process of cracking petroleum and sometimes referred to as "pressure-still residue"), plus 30 to 35% of Sun Oil wax 5512 (a highly purified paraffin wax having a melting point of 151° F. as measured by ASTM method D87-42). This coating may also contain a plasticizer in the amount of 2% of Acrawax, which is a high melting synthetic wax comprising a complex nitrogen derivative of a higher fatty acid. Tall oil may also be added as a plasticizer.

*Example IX*

Another satisfactory coating is one composed of 90% Teglac 128 and 10% blown castor oil. Teglac 128 is a rosin-modified maleic acid type synthetic resin having a softening point (ring and ball) of 145 to 155° C., an acid number of 260 to 290, and is soluble in alcohol. This coating can be applied as a hot melt to chipboard base.

*Example X*

A suitable coating for use in practicing this invention is composed of 85 parts of Vinsol resin and 15 parts of butyl acetyl ricinoleate. Vinsol is a natural resin obtained in the refining of rosin from pine wood. The Vinsol resin is characterized as the gasoline-insoluble fraction of the crude rosin. It has a softening point (ring and ball) 106° C. and has an acid number of 93. It is soluble in oxygenated solvents such as alcohols, ethers, esters, and ketone. It is also soluble in chlorinated hydrocarbons and most aromatic hydrocarbons but insoluble in aliphatic hydrocarbons. The coating is prepared by melting together the two ingredients. It may be applied to the base as a hot melt.

In describing this invention the words "easily fracturable root barrier" means that the root barrier can be fractured, i. e., broken into a number of pieces, by the exertion of very little force, such as the forces and stresses normally encountered in handling during transplanting or by the application of small amounts of additional force such as might be exerted by a squeeze of the hand or by a transplanting machine grasping the container.

In general, it is preferred to have a root barrier which is comparatively flexible and not easily fractured prior to contact with soil. This enables the container to be shipped flat and subsequently set up, when it is to be used, without breaking the root barrier. It also prevents the root barrier from being ruptured during the planting of the seed, seedling, cutting, small plant or the like within the container. By choice of a material which undergoes certain changes, when in contact with moist soil, it is possible for such a root barrier to be converted into a condition in which it is easily fracturable. This may occur in any one of a number of ways as illustrated by the following: A component of the root barrier may be leached out during contact with the soil resulting in the barrier becoming easily fracturable. A component of the root barrier may undergo hydrolysis or a reaction catalyzed by the presence of water which renders the root barrier easily fracturable. The action of soil organisms or enzymes and other materials associated therewith may bring about the desired change. These changes may involve only one or more of the components of the root barrier or the entire root barrier.

My container will confine plant roots over a wide range of varying pre-transplanting time intervals, is relatively insensitive to soil variations, changing atmospheric conditions, or the type of crop grown and may be rendered immediately permeable to the roots during transplanting.

Inasmuch as my container gives maximum protection to the root ball during the handling inherent in transplanting and need not be removed during transplanting, time and labor involved therein is reduced. The necessity of collecting removed containers and of either storing or disposing of them after transplanting is eliminated.

The present application is a continuation-in-part of my prior application Serial No. 165,100 filed May 29, 1950, now abandoned.

I claim:

1. A container for holding plant-growing media and adapted for use in growing young plants subsequently to be transplanted, comprising a supporting structure permeable to plant roots after contact with a plant-growing medium having thereon a continuous layer of a root barrier material which remains impenetrable to plant roots while in contact with a plant-growing medium and which after such contact is brittle so that it may be easily fractured and thus immediately rendered permeable to plant roots, whereby during transplanting the container may be fractured and the plant and plant-growing media therein planted without removing the container therefrom.

2. A plant container as in claim 1 wherein the layer of root barrier material is on the outside of the supporting structure.

3. A container for holding plant-growing media and adapted for use in growing young plants subsequently to be transplanted, comprising a wall permeable to plant roots after contact with such media having a continuous surface of a root barrier material which remains impenetrable to plant roots while in contact with such media and which after such contact becomes brittle and easily fracturable so that it is permeable to plant roots, whereby during transplanting the container may be fractured and the plant and plant-growing media therein planted without removing the container therefrom.

4. A plant container comprising a supporting structure formed to encircle the roots of a plant and a layer of material on said supporting structure which is a barrier to the roots of a plant during contact with plant-growing media and after such contact is brittle and easily fracturable by hand thereby rendering said layer of root barrier material penetrable to said roots.

5. A plant container as in claim 4 in which said supporting structure is in the form of a band.

6. A plant container as in claim 4 in which said supporting structure is in the form of a pot.

7. A container for holding plant-growing media and adapted for use in growing young plants subsequently to be transplanted, comprising a continuous layer of a root barrier material impenetrable to plant roots while in contact with a plant-growing medium and which after such contact is brittle and may be easily fractured and thus immediately rendered permeable to plant roots, whereby during transplanting the container may be fractured and the plant and plant-growing media therein planted without removing the container therefrom.

8. A container for holding plant-growing media in which young plants may be grown before being transplanted comprising a perishable wall encircling said media and a root-impermeable coating on said wall composed of gilsonite, cracking coil tar and paraffin.

9. A plant container as in claim 8 wherein the root-impermeable coating is on the outside of the wall.

References Cited in the file of this patent

UNITED STATES PATENTS

| Number | Name | Date |
|---|---|---|
| 1,212,428 | Watson | Jan. 16, 1917 |
| 1,226,311 | Clifford | May 15, 1917 |
| 1,424,829 | Kleb | Aug. 8, 1922 |
| 1,636,625 | Conrad | July 19, 1927 |
| 1,959,139 | Otwell | May 15, 1934 |
| 2,094,513 | Wilson et al. | Sept. 28, 1937 |
| 2,140,932 | Avery | Dec. 20, 1938 |

FOREIGN PATENTS

| Number | Country | Date |
|---|---|---|
| 981,148 | France | Jan. 10, 1951 |